(12) United States Patent  (10) Patent No.: US 8,934,423 B2
Newberg et al.  (45) Date of Patent: Jan. 13, 2015

(54) METHODS FOR MANAGING AT LEAST ONE BROADCAST/MULTICAST SERVICE BEARER

(75) Inventors: Donald G. Newberg, Hoffman Estates, IL (US); Peter M. Drozt, Prairie Grove, IL (US); Michael F. Korus, Eden Prairie, MN (US)

(73) Assignee: Motorola Solutions, Inc., Schaumburg, IL (US)

( * ) Notice: Subject to any disclaimer, the term of this patent is extended or adjusted under 35 U.S.C. 154(b) by 620 days.

(21) Appl. No.: 13/231,530

(22) Filed: Sep. 13, 2011

(65) Prior Publication Data

US 2013/0064160 A1 Mar. 14, 2013

(51) Int. Cl.
*H04W 4/00* (2009.01)
*H04W 76/00* (2009.01)

(52) U.S. Cl.
CPC .................. *H04W 76/002* (2013.01)
USPC ........... 370/329; 370/254; 370/312; 370/401; 370/465

(58) Field of Classification Search
CPC . H04L 12/1859; H04L 61/2061; H04L 45/16; H04L 12/18; H04L 47/806; H04L 49/201; H04L 61/2069; H04L 67/26; H04L 2012/5642
USPC ......... 370/252–255, 312, 328–329, 400–401, 370/465; 455/3.01, 3.06, 414.1, 456.3, 63.1
See application file for complete search history.

(56) References Cited

U.S. PATENT DOCUMENTS 6,775,242 B2 8/2004 Grilli et al.
7,096,013 B1 8/2006 Trandai et al.
7,738,423 B2 6/2010 Khan
7,768,914 B2 8/2010 Pauwels
7,924,723 B2 4/2011 Johnson et al.
7,995,510 B2 8/2011 Gao (Continued)

FOREIGN PATENT DOCUMENTS

CN 101325791 A 12/2008
EP 1581014 A1 9/2005

(Continued)

OTHER PUBLICATIONS

"MBMS—IP Multicast/Broadcast in #G Networks"; Hartung et al.; International Journal of Digital Multimedia Broadcasting; 2009.*

(Continued)

*Primary Examiner* — Benjamin H Elliott, IV
(74) *Attorney, Agent, or Firm* — Steven A. May

(57) ABSTRACT

A central resource manager is communicatively coupled to a broadcast/multicast service (BMS) capable system. The BMS capable system has a radio access network that includes at least one BMS service area and a total number of BMS bearers for transporting media streams. Each BMS service area has associated therewith a portion of the total number of BMS bearers. The central resource manager allocates, to a first local call controller of a plurality of local call controllers, a first portion of the total number of BMS bearers to be managed locally by the first local call controller, and identifies the first portion of the total number of BMS bearer to the first local call controller. The central resource manager also manages a second portion of the total number of BMS bearers for a subsequent allocation to at least one local call controller of the plurality of local call controllers.

19 Claims, 7 Drawing Sheets

(56) References Cited

U.S. PATENT DOCUMENTS

| | | | |
|---|---|---|---|
| 8,085,783 B2 | 12/2011 | Zhou et al. | |
| 8,098,590 B2 | 1/2012 | Catovic et al. | |
| 8,135,418 B2 | 3/2012 | Ranganathan et al. | |
| 8,175,069 B2 | 5/2012 | Wang et al. | |
| 8,451,910 B1 | 5/2013 | Lohier et al. | |
| 8,576,763 B2* | 11/2013 | Gonsa et al. | 370/312 |
| 2003/0088675 A1 | 5/2003 | Zheng | |
| 2003/0148779 A1* | 8/2003 | Aravamudan et al. | 455/519 |
| 2003/0211859 A1 | 11/2003 | Chen et al. | |
| 2004/0184470 A1 | 9/2004 | Holden | |
| 2005/0227718 A1 | 10/2005 | Harris et al. | |
| 2005/0235289 A1* | 10/2005 | Barillari et al. | 718/100 |
| 2005/0260997 A1* | 11/2005 | Korale et al. | 455/452.2 |
| 2005/0276256 A1 | 12/2005 | Raitola et al. | |
| 2006/0034202 A1 | 2/2006 | Kuure et al. | |
| 2006/0111104 A1 | 5/2006 | Hyslop | |
| 2007/0133527 A1* | 6/2007 | Kuure et al. | 370/389 |
| 2007/0153727 A1* | 7/2007 | McBeath et al. | 370/329 |
| 2007/0264992 A1 | 11/2007 | Maenpaa | |
| 2007/0281722 A1 | 12/2007 | Gao | |
| 2008/0102811 A1 | 5/2008 | Amirjoo et al. | |
| 2008/0212583 A1 | 9/2008 | Rey et al. | |
| 2008/0267109 A1 | 10/2008 | Wang et al. | |
| 2008/0293428 A1* | 11/2008 | Rey et al. | 455/452.2 |
| 2008/0311892 A1 | 12/2008 | Lee et al. | |
| 2009/0080363 A1 | 3/2009 | Song et al. | |
| 2009/0080451 A1 | 3/2009 | Gogic | |
| 2009/0103466 A1 | 4/2009 | Gu et al. | |
| 2009/0113487 A1 | 4/2009 | Nanjunda Swamy | |
| 2009/0207773 A1 | 8/2009 | Feng et al. | |
| 2009/0245155 A1 | 10/2009 | Fukunaga et al. | |
| 2009/0303909 A1 | 12/2009 | Farhoudi et al. | |
| 2009/0323574 A1 | 12/2009 | Koskinen et al. | |
| 2009/0323638 A1 | 12/2009 | Catovic et al. | |
| 2010/0027541 A1 | 2/2010 | Eriksson et al. | |
| 2010/0061308 A1 | 3/2010 | Becker et al. | |
| 2010/0081451 A1 | 4/2010 | Mueck et al. | |
| 2010/0128649 A1 | 5/2010 | Gonsa et al. | |
| 2010/0128722 A1 | 5/2010 | Madour et al. | |
| 2010/0157969 A1 | 6/2010 | Swamy et al. | |
| 2010/0222055 A1 | 9/2010 | Cho et al. | |
| 2010/0232340 A1 | 9/2010 | Godor et al. | |
| 2010/0265867 A1 | 10/2010 | Becker et al. | |
| 2010/0302988 A1 | 12/2010 | Becker | |
| 2010/0323698 A1 | 12/2010 | Rune et al. | |
| 2010/0332610 A1 | 12/2010 | Cherian et al. | |
| 2011/0077006 A1 | 3/2011 | Hsu | |
| 2011/0128903 A1 | 6/2011 | Futaki et al. | |
| 2011/0145846 A1 | 6/2011 | Kim | |
| 2011/0149879 A1 | 6/2011 | Noriega et al. | |
| 2011/0151885 A1 | 6/2011 | Buyukkoc et al. | |
| 2011/0159880 A1 | 6/2011 | Kumar et al. | |
| 2011/0305183 A1 | 12/2011 | Hsu et al. | |
| 2011/0305184 A1 | 12/2011 | Hsu | |
| 2012/0008525 A1* | 1/2012 | Koskinen | 370/253 |
| 2012/0014264 A1 | 1/2012 | Wang | |
| 2012/0033623 A1 | 2/2012 | Chu et al. | |
| 2012/0044907 A1 | 2/2012 | Mildh | |
| 2012/0170501 A1 | 7/2012 | Drozt et al. | |
| 2012/0170502 A1 | 7/2012 | Korus et al. | |
| 2012/0172028 A1 | 7/2012 | Korus et al. | |
| 2012/0230240 A1 | 9/2012 | Nebat et al. | |
| 2012/0236776 A1 | 9/2012 | Zhang et al. | |
| 2013/0064160 A1* | 3/2013 | Newberg et al. | 370/312 |
| 2013/0301509 A1 | 11/2013 | Purnadi et al. | |
| 2014/0177436 A1 | 6/2014 | Korus et al. | |
| 2014/0177437 A1 | 6/2014 | Korus et al. | |
| 2014/0274080 A1 | 9/2014 | Gilbert et al. | |

FOREIGN PATENT DOCUMENTS

| | | |
|---|---|---|
| EP | 2 302 969 A1 | 3/2011 |
| WO | 02089501 A1 | 11/2002 |
| WO | 03098871 A1 | 11/2003 |
| WO | 2006027006 A1 | 3/2006 |
| WO | 2008123824 A2 | 10/2008 |
| WO | 2011000947 A1 | 1/2011 |
| WO | 2011068421 A1 | 6/2011 |

OTHER PUBLICATIONS

"MBMS Multicast Mode of UMTS"; Alexiou et al.; 2009.*
International Search Report and Written Opinion for related counterpart International Patent Application No. PCT/US2011/067354 mailed on Mar. 21, 2012.
International Search Report and Written Opinion for related counterpart International Patent Application No. PCT/US2011/066709 mailed on Jul. 6, 2012.
Final Office Action mailed Apr. 25, 2013 in related U.S. Appl. No. 12/981,323, Michael F. Korus, filed Dec. 29, 2010.
Final Office Action mailed Apr. 15, 2013 in related U.S. Appl. No. 12/981,226, filed Dec. 29, 2010.
International Search Report and Written Opinion for related counterpart International Patent Application No. PCT/US20112/053051 mailed on Nov. 26, 2012.
Non Final Office Action mailed Oct. 26, 2012 in related U.S. Appl. No. 12/981,226, filed Dec. 29, 2010.
Non Final Office Action mailed Oct. 26, 2012 in related U.S. Appl. No. 12/981,323, filed Dec. 29, 2010.
Non Final Office Action mailed Nov. 8, 2012 in related U.S. Appl. No. 12/981,274, filed Dec. 29, 2010.
Final Office Action mailed Sep. 23, 2013 in U.S. Appl. No. 12/981,274, Michael F. Korus, filed Dec. 29, 2010.
International Search Report and Written Opinion for related counterpart International Patent Application No. PCT/US2011/066705 mailed on Jan. 18, 2013.
3rd Generation Partnership Project (3GPP), "3GPP TS 26.246 V9.0.0: Technical Specification Group Services and System Aspects; Transparent end-to-end packet switched streaming service (PSS); 3GPP SMIL Language Profile (Release 9)," 3GPP Standard, pp. 1-17, Dec. 10, 2009.
Open Mobile Alliance: "Poc User Plane Approved Version 1.0.3," OMA-TS-PoC_UserPlane-V1_0_3-20090922-A, pp. 1-12, Sep. 22, 2009.
Open Mobile Alliance: "OMA PoC Control Plane Approved Version 1.0.3," OMA-TS-PoC_ControlPlane-V1_0_3-20090922-A, pp. 1-8, Sep. 22, 2009.
Rosenberg, J. et al., "SIP: Session Initiation Protocol," RFC 3261, Network Working Group Request for Comments, pp. 14, Jun. 1, 2002.
"Multimedia Broadcast and Multicast Services in 3G Mobile Netowrks," Alcatel Telecommunications Revenues, pp. 1-12, Apr. 1, 2004.
Non Final Rejection mailed Mar. 3, 2013 in related U.S. Appl. No. 12/981,374, Michael F. Korus, filed Dec. 29, 2010.
Open Mobile Alliance Standard "OMA-TS-PoC_Multicast_PoC-V2.1-20091222-C"; Dec. 22, 2009; Sections 6 and 7; pp. 23-27.
3GPP TS 26.346 V.9.4.0; "3rd Generation Partnership Project; Technical Specification Group Services and System Aspects; Multimedia Broadcast/Multicast Service (MBMS); Protocols and CODECS, Release 9"; Sections 5.4.1 and 8; Sep. 2010.
3GPP TS 23.246 V.9.5.0; 3rd Generation Partnership Project; Technical Specification Group Services and System Aspects; Multimedia Broadcast/Multicast Service (MBMS); Architecture and Functional Description, Release 9; Sections 4.4.3, 4.4.4, and 8; Jun. 2010.
3GPP TSG RAN WG3 #59bis; "E-MBS Functions of Statistical Multiplexing"; R2-074339; Oct. 8-12, 2007; Shanghai, China; 8 Pages.
Ericsson et al., "MBMS Interest Indication for connected UEs," 3GPP Draft, R2-116190, 3rd Generation Partnership Project (3GPP), Mobile Competence Centre, vol. RAN WG2, No. San Francisco, USA, pp. 20111110-20111114, Nov. 8, 2011.
Hallahan, R. and Peha, J.M., "Policies for Public Safety Use of Commercial Wireless Networks," 38th Telecommunications Policy Reasearch Conference, Retrieved from the Internet URL: http://users.ece.cmu.edu/~peha/public_safety_priority_access.pdf on Jul. 21, 2014, pp. 1-34.

(56) References Cited

OTHER PUBLICATIONS

Huawei, "Stage 2 agreements on service continuity and location information for MBMS for LTE," 3GPP Draft, R2-115596, 3rd Generation Partnership Project (3GPP), Mobile Competence Centre, vol. RAN WG2, No. Zhuhai; Oct. 10, 2011, Oct. 26, 2011.

International Search Report for counterpart International Patent Application No. PCT/US2013/071828 mailed on May 13, 2014.

International Search Report for counterpart International Patent Application No. PCT/US2013/071837 mailed on May 13, 2014.

Non-Final Office Action mailed Mar. 1, 2013 in U.S. Appl. No. 12/981,274, Michael F. Korus et al., filed Dec. 29, 2010.

Non-Final Office Action mailed Jun. 4, 2014 in U.S. Appl. No. 12/981,323, filed Dec. 29, 2010.

Notice of Allowance mailed May 21, 2014 in U.S. Appl. No. 13/724,098, Michael F. Korus et al., filed Dec. 21, 2012.

Qualcomm Europe, "Qualcomm proposal for E-UTRAN Architecture and Protocols," 3GPP Draft, R2-052921, 3rd Generation Partnership Project (3GPP), Mobile Competence Centre, vol. RAN WG2, No. Seoul, Korea; Nov. 2, 2005.

Notice of Allowance mailed Jul. 23, 2014 in U.S. Appl. No. 12/981,274 Michael F. Korus et al., filed on Dec. 29, 2012.

Notice of Allowance mailed Aug. 11, 2014 in U.S. Appl. No. 131724,098, Michael F. Korus et al., filed on Dec. 21, 2012.

Notice of Allowance mailed Aug. 21, 2014 in U.S. Appl. No. 12/981,274 Michael F. Korus et al., filed on Dec. 29, 2012.

Patent Examination Report No. 1 mailed Oct. 8, 2014 in corresponding Australian Patent Application No. 2011352443.

Non-Final Office Action mailed Oct. 8, 2014 in U.S. Appl. No. 13/839,752, Stephens S. Gilbert et al., filed on Mar. 15, 2013.

Non-Final Office Action mailed Oct. 9, 2014 in U.S. Appl. No. 13/724,039, Michael F. Korus et al., filed on Dec. 21, 2012.

Final Office Action mailed Oct. 23, 2014 in U.S. Appl. No. 12/981,323, Michael F. Korus et al., filed on Dec. 29, 2012.

\* cited by examiner

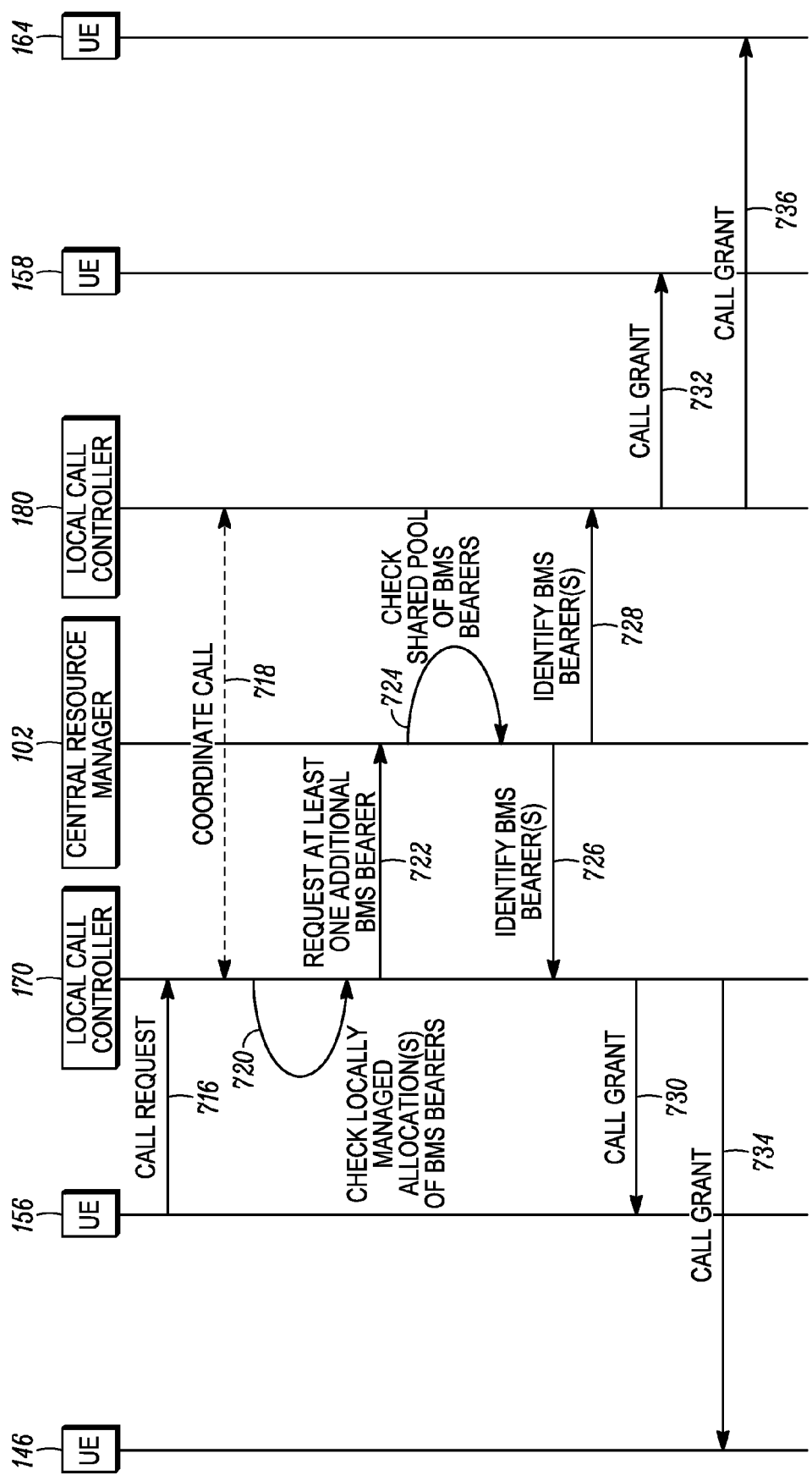

METHODS FOR MANAGING AT LEAST ONE BROADCAST/MULTICAST SERVICE BEARER

RELATED APPLICATIONS

The present application is related to the following U.S. applications commonly owned together with this application by Motorola Solutions, Inc.:

Ser. No. 12/981,323 filed 29 Dec. 2010, titled "Methods for Assigning a Plethora of Group Communications Among a Limited Number of Pre-Established MBMS bearers in a Communication System";

Ser. No. 12/981,274 filed 29 Dec. 2010, titled "Methods for Binding and Unbinding a MBMS Bearer to a Communication Group in a 3GPP Compliant System"; and Ser. No. 12/981,226 filed 29 Dec. 2010, titled "Methods for Transporting a Plurality of Media Streams over a Shared MBMS Bearer in a 3GPP Compliant Communication System".

TECHNICAL FIELD

The technical field relates generally to communication systems, and more particularly to methods for managing at least one broadcast/multicast service (BMS) bearer among a plurality of communication groups.

BACKGROUND

Long Term Evolution (LTE) is a radio technology designed to increase the capacity and speed of mobile telephone networks and provides for an end-to-end Internet Protocol (IP) service delivery of media. Currently, LTE comprises a set of enhancements to the Universal Mobile Telecommunications System (UMTS), which is described in a suite of Technical Specifications (TS) developed within and publicized by 3GPP.

LTE, in part, provides for a flat IP-based network architecture designed to ensure support for, and mobility between, some legacy or non-3GPP systems such as, for instance, general packet radio service (GPRS) and Worldwide Interoperability for Microwave Access (WiMAX). Some of the main advantages with LTE are high throughput, low latency, plug and play, frequency-division duplex (FDD) and time-division duplex (TDD) in the same platform, improved end user experience, simple architecture resulting in low operating costs, and interoperability with older standard wireless technologies, such as Global Systems for Mobile Communications (GSM), cdmaOne™, W-CDMA (UMTS), and CDMA2000®.

LTE and other BMS capable systems (meaning systems having elements that operate in compliance with BMS TSs, such as 3GPP TSs) also provide BMS point-to-multipoint transport of media to user equipment (UE) operating on the system. Unfortunately, the BMS transport mechanisms that are described, for example, in the 3GPP TSs, have many shortcomings when compared to point-to-multipoint transport mechanisms offered by other systems. However, if organizations having more stringent requirements for media transport are going to realistically be able to use BMS capable systems, such as LTE systems, similar performance as the legacy systems, including similar performance for the point-to-multipoint mechanisms, is needed.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 7 is a message sequence diagram illustrating a method for managing at least one BMS bearer in accordance with another embodiment.

Figure 1:
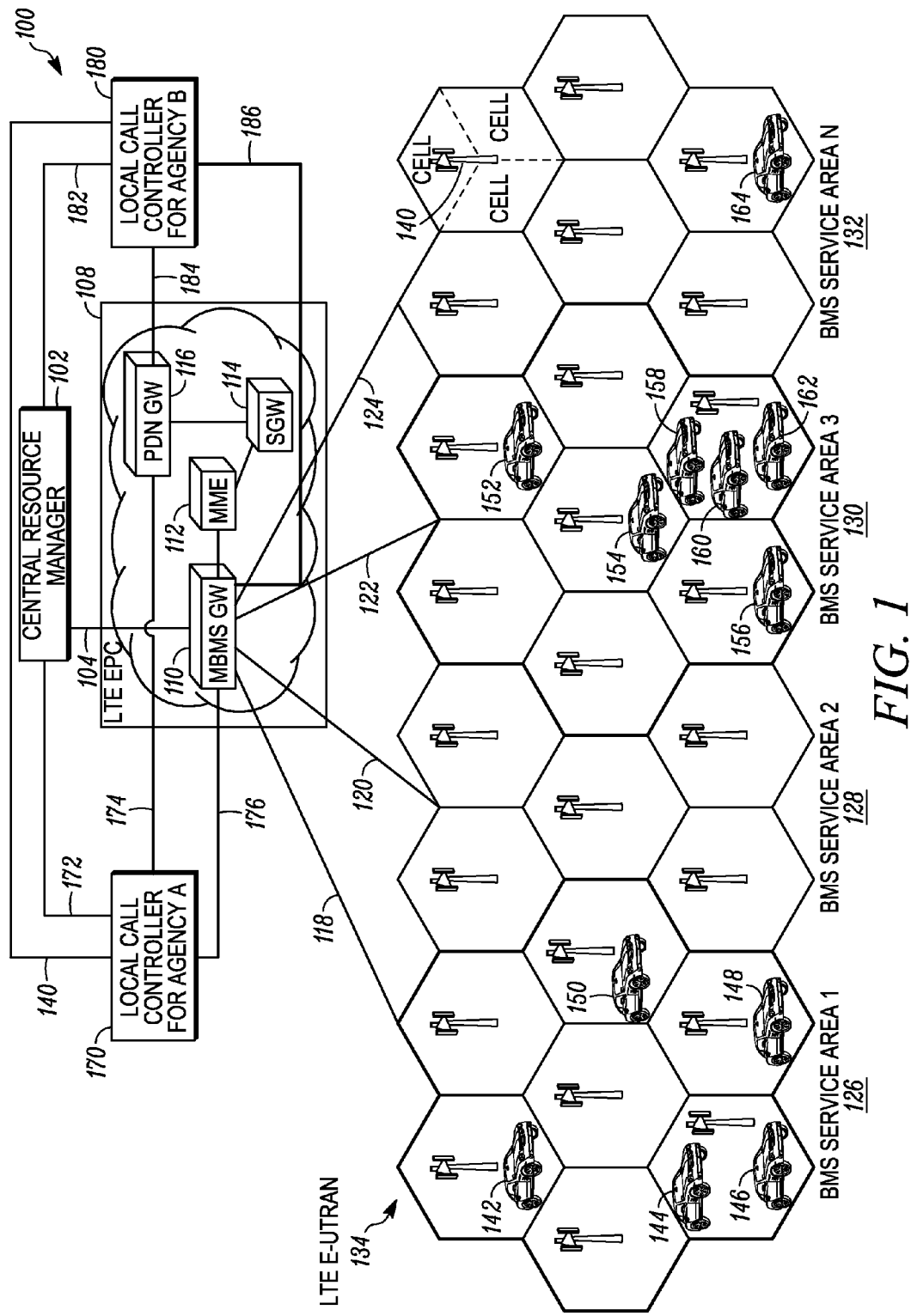
FIG. 1 is a system diagram of a communication system that implements methods for managing at least one BMS bearer in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented, where appropriate, by conventional symbols in the drawings, showing only those specific details that are pertinent to understanding the various embodiments so as not to obscure the disclosure with details that will be readily apparent to those of ordinary skill in the art, having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to an embodiment, a central resource manager (an infrastructure device) coupled to a BMS capable system performs a method to manage at least one BMS bearer. The BMS capable system has a radio access network (RAN) partitioned into at least one BMS services area (SA) and a total number of BMS bearers for transporting media streams, wherein each BMS SA has associated therewith a portion of the total number of BMS bearers. The BMS bearers may be established a priori or established when a local call controller requests a BMS bearer. The central resource manager: allocates, to a first local call controller of a plurality of local call controllers, a first portion of the total number of BMS bearers to be managed locally by the first local call controller; identifies the first portion of the total number of BMS bearers to the first local call controller; and manages a second portion of the total number of BMS bearers for subsequent allocation to at least one local call controller of the plurality of local call controllers.

Pursuant to a further embodiment of the present disclosure, a first local call controller performs a method for managing BMS bearers. Accordingly, the first local call controller: receives, from a central resource manager, an identification of a first portion of the total number of BMS bearers allocated to the local call controller; locally manages the allocation of the first portion of the total number of BMS bearers; receives a request to transmit a media stream to a communication group; if there are sufficient BMS bearers in the first portion of the total number of BMS bearers to support transmission of the media stream to the communication group, assigns at least one BMS bearer from the first portion of the total number of BMS bearers to the group communication; and if there are insufficient BMS bearers in the first portion of the total number of BMS bearers to support transmission of the media stream to the communication group, sends a request for at least one additional BMS bearer, and responsive to the request for the at least one additional BMS bearer, receives an identification of at least one additional BMS bearer from the total number of BMS bearers.

Referring now to the figures, and in particular FIG. 1, a BMS capable system in accordance with some embodiments is shown and indicated generally at 100. For example, the BMS capable system may be a 3GPP MBMS, specifically the 3GPP LTE MBMS, the 3GPP UMTS MBMS, Worldwide Interoperability for Microwave Access (WiMax) multicast and broadcast service, or the like. System 100 includes system elements, such as, a first infrastructure device 102 (illustrated as a central resource manager), and a second and a third infrastructure devices 170 and 180 which can each be, for instance, an application server (wherein each is illustrated as a local call controller). System 100 also includes an LTE Evolved Packet Core (EPC) 108 having a Mobility Management Entity (MME) 112, a MBMS Gateway (MBMS GW) 110, a Serving Gateway (SGW) 114, and a Packet Data Network Gateway (PDN GW) 116 with other elements of an LTE EPC not included for ease of illustration, such as a Broadcast Multicast Service Center (BM-SC). System 100 may further include system elements, such as, an access network (in this case an LTE Evolved Universal Terrestrial Radio Access Network (E-UTRAN)) 134 that includes a plurality of eNodeB (LTE base station) infrastructure devices (with one labeled as 140), and a plurality of UE 142, 144, 146, 148, 150, 152, 154, 156, 158, 160, 162, and 164. In general, the EPC 108 and the E-UTRAN 134 are referred to collectively as the LTE system. The system elements of communication system 100 and the interfaces between them are further described below.

The E-UTRAN 134 elements, EPC 108 elements, the central resource manager 102, the local call controllers 170, 180, and UE 142-164 implement protocols and signaling in compliance with, for example, 3GPP TSs 26.346 and 23.246, which describe aspects of 3GPP MBMS; and the terms LTE communication system, LTE system, and Evolved Packet System (EPS) are used interchangeably herein and are each defined as being inclusive of the E-UTRAN 134 and the EPC 108 but not inclusive of the central resource manager 102, the local call controllers 170, 180 or the UE. Moreover, only a limited number of EPC elements, local call controllers, and UE, and one central resource manager and E-UTRAN are shown in the diagram, but more such elements may be included in an actual system implementation. Also, the E-UTRAN can be any type of access network, including any 3G network, e.g. UMTS, or 4G network, e.g. WiMAX, access network, or WiFi.

In general, the UE, the central resource manager 102, the local call controller 170, 180, the EPC 108 logical elements, and the E-UTRAN 134 elements are each implemented using (although not shown) a memory, one or more network interfaces, and a processing device that are operatively coupled, and which when programmed form the means for these system elements to implement their desired functionality, for example as illustrated by reference to the methods and diagrams shown in FIGS. 2-7. The network interfaces are used for passing signaling, also referred to herein as messaging, (e.g. messages, packets, datagrams, frames, superframes, and the like) between the elements of the system 100. The implementation of the network interface in any particular element depends on the particular type of network, i.e. wired and/or wireless, to which the element is connected.

Where the network supports wireless communications, the interfaces comprise elements including processing, modulating, and transceiving elements that are operable in accordance with any one or more standard or proprietary wireless over-the-air interfaces, wherein some of the functionality of the processing, modulating, and transceiving elements may be performed by means of the processing device through programmed logic, such as software applications or firmware stored on the memory device of the system element or through hardware.

The processing device utilized by the UE, the central resource manager 102, the local call controllers 170, 180, the EPC 108 logical elements, and the E-UTRAN 134 elements may be partially implemented in hardware and, thereby, programmed with software or firmware logic or code for performing functionality described by reference to FIGS. 2 to 7; and/or the processing device may be completely implemented in hardware, for example, as a state machine or application specific integrated circuit (ASIC) to perform such functionality. The memory implemented by these system elements can include short-term and/or long-term storage of various information needed for the functioning of the respective elements. The memory may further store the software or firmware for programming the processing device with the logic or code needed to perform its functionality.

We now turn to a brief description of the functionality of the system elements shown in FIG. 1, which will aid in the understanding of the later description of the methods and signaling diagrams illustrated by reference to FIGS. 2 to 7. The UE 142-164, are also referred to in the art as subscribers, communication devices, access devices, access terminals, mobile stations, mobile subscriber units, mobile devices, user devices, and the like. Although illustratively shown in FIG. 1 as a device used in a vehicle, the UE can be any type of communication device, such as radios, mobile phones, mobile data terminals, Personal Digital Assistants (PDAs), laptops, two-way radios, cell phones, and any other device capable of operating in a wired or wireless environment and that can be used by a user in the system.

The central resource manager 102 is an intermediary device that facilitates the establishment of BMS bearers in the LTE E-UTRAN, some of which are reserved specifically for the local call controllers to allocate for group communications and some of which are reserved in a shared or common pool and are unallocated to any local call controller until requested Infrastructure devices 170 and 180 both facilitate transport of media (e.g. voice, data, video, etc.) from one or more source applications to one or more destination applications (such as members affiliated with a communication group, such as a talkgroup) over the LTE system. As such, the sourcing applications may be included in, for instance, a computer aided dispatch (CAD) server, a media server, etc.

for different entities, such as public safety agencies A and B (e.g. fire department, police department, or the like). The central resource manager 102 interfaces with the local call controllers 170 and 180, respectively, via links 172 and 182. In at least one embodiment, the local call controllers 170 and 180 can communicate directly (without the need for central resource manager 102) via a link 140.

In one illustrative embodiment, infrastructure devices 170 and 180 are each an application server in a packet data network providing application layer services to UE connected to the E-UTRAN 134 that are authorized and have the capabilities to use these services. In this instance, infrastructure devices 170 and 180 are local call controllers providing PTT services to the UE. Other services may include, for example, broadcasting images, distributing video, or the like. In a further illustrative embodiment, the local call controllers 170, 180 communicate with the UE using control signaling described, for example, in OMA-TS-PoC_ControlPlane-V1_0_3-20090922-A and OMA_TS_PoC_UserPlane-V1_0_3-20090922-A (and any subsequent revisions, hereinafter referred to the OMA PoC TS), which defines the procedures of a PTT over Cellular (PoC) Client (e.g. the UE) and a PoC Server (e.g. the local call controller). However, the present teachings are not limited to the use of OMA PoC but can be extended to other protocols, both standard and proprietary.

The EPC 108 is an all-IP core network that provides mobile core functionality that, in previous mobile generations (2G, 3G), has been realized through two separate sub-domains: circuit-switched (CS) for voice and packet-switched (PS) for data. The EPC 108 enables the above-mentioned all IP end-to-end delivery of media: from mobile handsets and other UE with embedded IP capabilities, over IP-based eNodeBs, across the EPC 108 and throughout the application domain, IP Multimedia Subsystem (IMS) and non-IMS.

As mentioned above, the EPC 108 comprises the logical components of the MME 112, the MBMS GW 110, the SGW 114, and the PDN GW 116 and further comprises the respective interfaces (also referred to in the art as reference points) between these logical entities. The logical entities of the EPC 108 are shown as separate logical blocks and indeed can, in some embodiments, each be included in separate hardware devices or can, alternatively, be combined in one or more hardware devices. Also, the EPC 108, depending on the size of the network, may have several such components serving thousands or tens of thousands of UE and serving many application servers (e.g. local call controllers). Additional known elements and interfaces in an EPC 108 that are needed for a practical embodiment of the EPC 108 are not shown in FIG. 1 for the sake of clarity.

Turning first to the MME 112, this EPC element is the control-node for UE access on the LTE system. It is involved in the bearer activation/deactivation process and is also responsible for choosing the SGW for a UE at the initial attach and at time of intra-LTE handover involving Core Network (CN), i.e. MME, SGW, PDN GW, node relocation. The MME 112 is responsible for authenticating the user (by interacting with a home subscriber server (HSS), not shown), and the MME 112 is also responsible for generation and allocation of temporary identities or identifiers to UE.

As used herein, the term bearer or bearer resource is defined as a transmission path in a network (such as a RAN) and is used to carry UE data traffic (also termed, herein, as communications or service data flows (SDFs)). An EPS bearer is defined as a bearer that extends between the UE and the PDN GW and encompasses both a wireless path (UE to eNodeB), as well as a network transport path (eNodeB to PDN GW). A bearer can be bidirectional, i.e. having both an uplink path from the UE to the application server and a downlink path from the application server to the UE; or a bearer can be unidirectional, such as a common point-to-multipoint (PTM) downlink path from the application server to the UE for BMS traffic, which is referred to herein as a BMS bearer. Each BMS bearer is identified using a unique and/or different identifier, which in the 3GPP TSs is called a Temporary Mobile Group Identity (TMGI). In some embodiments, between the eNodeB and the UE, the BMS bearer may take the form of a Multicast Traffic Channel (MTCH), with the traffic associated to a specific TMGI being carried by a specific MTCH at any given time.

The MBMS GW 110 is an entry point in the LTE system from the central resource manager 102 via a reference 104 to establish the total BMS bearers in the RAN. The MBMS GW 110 is also an entry point in the LTE system from an application server via a reference point 176, 186, and it distributes BMS traffic to all eNodeBs within BMS service areas. BMS may use Single Frequency Network (SFN) transmission, also referred to as MBSFN. In MBSFN, the BMS transmission happens from a time-synchronized set of eNodeBs in the service area, using the same resource blocks. IP multicast can be used for distributing the traffic from the BMS GW 114 to the different eNodeBs. Moreover, in an embodiment, media is delivered from the LTE EPC (via the MBMS-GW 110) to the eNodeBs in each MBSFN Area of the E-UTRAN 134 using Protocol-Independent Multicast source-specific multicast (PIM-SSM), as illustrated by links 118, 120, 122, and 124.

In some embodiments, as described in the 3GPP TSs, a RAN, such as the LTE E-UTRAN 134, can be partitioned into one or more BMS service areas (referred to as MBMS service areas in 3GPP), with each BMS service area covering a particular geographical area in which BMS transmissions to the UE can occur. A BMS service area can be further partitioned into one or more MBSFN areas each identified by a MBSFN area ID. Further, each MBSFN Area generally includes a plurality of cells, wherein a cell is defined as being inclusive of a single eNodeB's coverage area or a portion of an eNodeB's coverage area and can be identified by a cell identifier. As used herein, however, the terms "BMS service area" and "MBSFN area" are used interchangeably since, in the described embodiment, the BMS service area and MBSFN area have a one-to-one correspondence. However, this is meant only to be illustrative and to provide a simple embodiment for ease of understanding, and is in no way meant to limit the scope of the present teachings. As such, the present teachings also apply to a logical partitioning of the LTE E-UTRAN 134 where there is a one-to-many correspondence between the BMS service area and MBSFN area.

The SGW 114 routes and forwards user point-to-point data packets, while also acting as the mobility anchor for the user plane during inter-eNodeB handovers and as the anchor for mobility between LTE and other 3GPP technologies. There are also links between the SGW 114 and the eNodeBs for transporting media that are not shown in FIG. 1 for the purpose of simplifying the diagram. The PDN GW 116 provides connectivity to the UE to external packet data networks (PDNs) by being the point of exit and entry of traffic for the UE via reference points 174 and 184. A UE may have simultaneous connectivity with more than one PDN GW for accessing multiple PDNs. The PDN GW 116 performs policy enforcement, packet filtering for each user, charging support, lawful interception and packet screening using policy and charging rules provided by a Policy and Charging Rules Function (PCRF), which is not shown. Another key role of the PDN GW 118 is to act as the anchor for mobility between 3GPP and non-3GPP technologies, such as WiMAX and 3GPP2 (CDMA 1X and EvDO).

E-UTRAN 134 comprises multiple cells each served by an eNodeB. As shown in FIG. 1, LTE E-UTRAN 134 includes many eNodeBs (one such eNodeB labeled as 140) comprising one or more cells. The eNodeBs serve as the intermediate infrastructure device between the UE 142-164 and the EPC 108 and a point of access for the UE to assigned or allocated bearers. Each cell represents a geographic coverage area that provides the wireless resources, termed herein as bearers, for carrying data (or SDFs) for UE connected to the E-UTRAN. Although in this illustrative implementation, each eNodeB coverage area comprises three cells, the number of cells per eNodeB coverage area may be more than three and as few as one.

Furthermore, the LTE EUTRAN 134 comprises a plurality of BMS service areas 126, 128, 130, and 132, each having at least one eNodeB supporting at least one cell. As shown in FIG. 1, the BMS service areas partially overlay (for example the UE 150 is located in an eNodeB coverage area that is included in BMS service areas 126 and 128). However, at least some (or all) of the BMS service areas could have mutually exclusive geographically boundaries.

In accordance with an embodiment of the present disclosure, the central resource manager may establish a plurality of BMS bearers a priori in each BMS service area (i.e. in each MBMS area), meaning that the BMS bearers may be "preestablished" or already established before a local call controller (e.g. 170 and 180) receives a requests to transmit media over the EPS to a communication group. Accordingly, the central resource manager 102 may establish or pre-establish a total number of BMS bearers across all of the BMS service areas, reserve a portion or subset of the total number of BMS bearers (also referred to herein as "local resources") for use by one or more local call controllers, wherein each local call controller manages its designated and identified local resources (e.g. by TMGI) and allocates its local resources upon receiving call requests. This configuration is in contrast to the prior art where a central call controller maintains control over all radio resources and allocates the resources itself for each call requests. In further accord with the present teachings, the central resource manager also reserves a portion or subset of the total number of pre-established BMS bearers in a common pool (also referred to herein as "shared resources" or "shared pool") that is not reserved for any of the local call controllers in particular. Instead the resources in the shared pool are allocated, as needed, to a local call controller that runs low on local resources.

Regarding the remaining FIGS. 2-7, FIG. 2 illustrates a method for initial BMS bearer establishment and allocation of shared and local BMS bearers by the central resource manager 102. FIGS. 3-7 illustrate various embodiments that show the central resource manager 102 and the local call controllers 170, 180 managing the shared and local BMS bearers. In FIGS. 2-7, each local call controller 170 or 180 has the ability to individually manage a pool of local BMS bearers, apart from the central resource manager 102, once these local BMS bearers have been allocated and identified by the central resource manager 102 to the local call controller. This is in contrast to the prior art where a central call controller 102 performs all of the resource management and allocation of BMS bearers for call requests. In FIGS. 2-7 the central resource manager 102 coordinates the allocation and identification of BMS bearers to the local call controllers 170, 180 and the management of shared BMS bearers.

In a particular embodiment, for example, the BMS bearers serve as voice channels, the central resource manager 102 establishes all of the BMS bearers over all of the BMS services areas. It should be noted that although specific reference is made to voice channels by reference to FIGS. 2-7, the present teachings can be used to manage BMS bearers that are used to carry any type of media. As shown by reference to FIG. 2, the central resource manager 102 further establishes locally managed BMS bearers and shared BMS bearers. The locally managed BMS bearers can be, for instance, allocated to local call controllers based on normal work patterns. For example, the TMGIs for the BMS bearers (which identify the bearers) and IP Multicast addresses for each of the BMS bearers may be distributed, by the central resource manager 102, to the various agencies. The shared BMS bearers are the remaining bearers that are maintained and managed by the central resource manager 102 for shared use. The TMGIs for each of the shared BMS bearers, for example, are allocated by the central resource manager 102 when needed or requested.

For normal group calls, the local call controller for the agency assigns a BMS bearer from its locally managed allocation of BMS bearers to users, as needed. If BMS bearers from its locally managed allocation are not available, either due to oversubscription or the fact that users have roamed to service areas where the local call controller for the agency is not locally managing a BMS bearer allocation, the local call controller for the agency can request to borrow a BMS bearer from the shared pool (as illustrated by reference to FIG. 3). One use case is that the agency is involved in an important communication and is therefore entitled to more than its normal allocation. Alternatively, the local call controller for the agency can request to borrow a local BMS bearer from another agency that is managing an available BMS bearer (as illustrated by reference to FIG. 6). One use case is that a roaming user is assisting a different agency in a communication.

Moreover, in accordance with another embodiment, the central resource manager 102 may reclaim a BMS bearer from an agency to support an incident involving other agencies (as illustrated by reference to FIG. 5). A BMS bearer may also be used for multi-agency calls, wherein a common set of TMGIs for the BMS bearers, for example, is distributed to all participating agencies so that they can manage their users individually but utilize a shared BMS bearer (as illustrated by reference to FIG. 7). In another illustrative approach, the agencies may be allocated only a small number of BMS bearers to manage in order to keep most of the BMS bearers in the shared pool of BMS bearers. As an agency comes close to running out or low of available BMS bearers allocated to the agency, the local call controller for the agency may request from the central resource manager 102 additional BMS bearers from the shared pool for local use (as illustrated by reference to FIG. 4).

Figure 2:
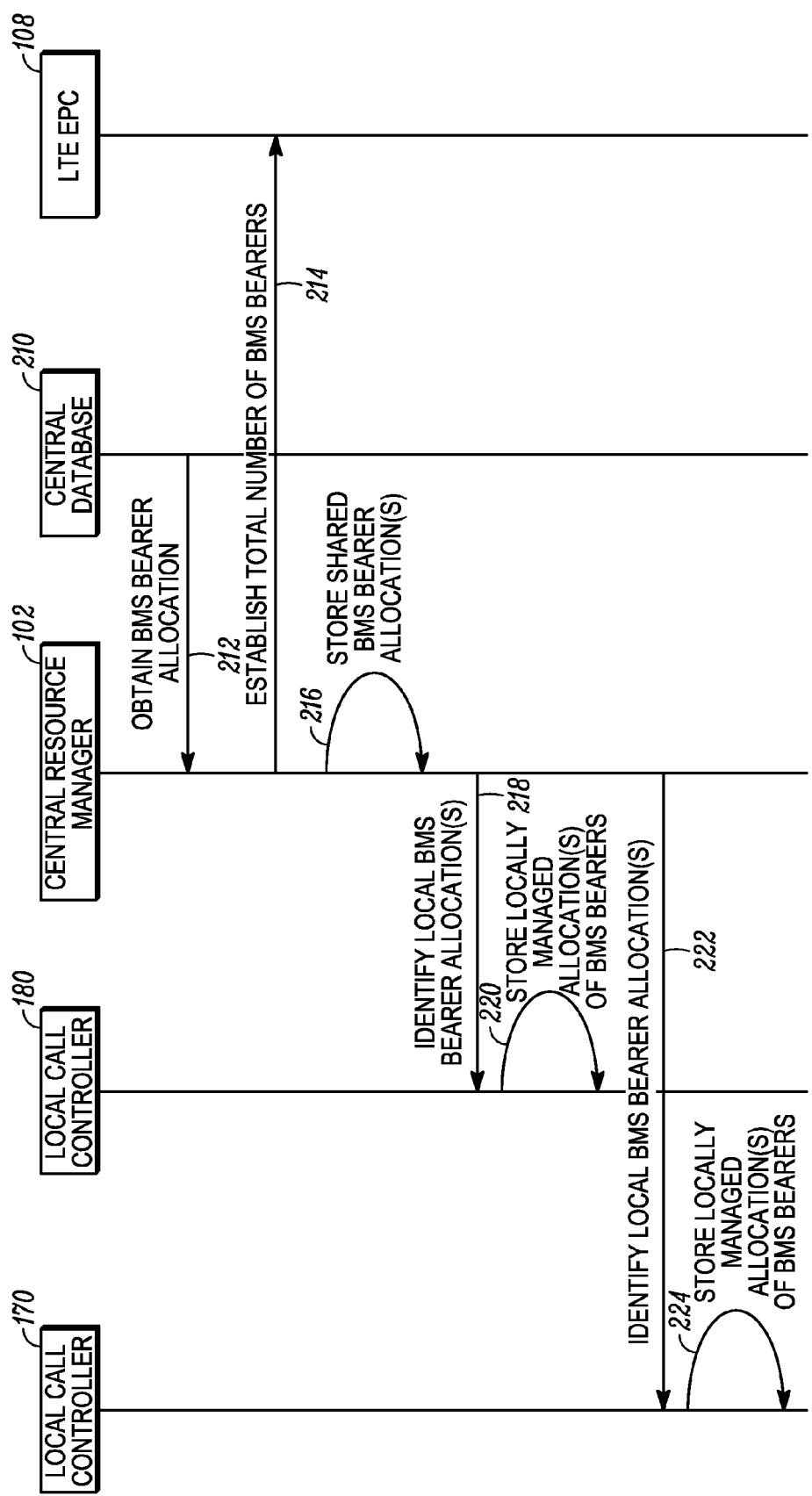
FIG. 2 is a message sequence diagram illustrating a method for managing at least one BMS bearer in accordance with an embodiment.

Turning back to FIG. 2, a message sequence diagram is shown that illustrates initial BMS bearer establishment by a central resource manager, the allocation of BMS bearers to one or more local call controllers to manage locally, and the reservation of shared BMS bearers, by the central resource manager. FIG. 2 illustratively shows the local call controller 170, the local call controller 180, the central resource manager 102, a central database 210, and the LTE EPC 108 (which could alternatively be the core infrastructure in an access network implementing a different radio access technology).

In one embodiment, there is a predefined allocation of how many BMS bearers (e.g. voice channels) are reserved in each BMS SA, which ones are allocated to, and therefore managed by, each agency, and which ones are shared and therefore managed centrally by the central resource manager. However, in another embodiment, at least a portion of such determinations can be dynamically determined based on system usage over time, for instance. Thus, in this example, let us assume that the central resource manager 102 obtains the BMS bearer allocation information, for instance, as stored in and received from a central database 210 (at 212), to establish via the LTE EPC 108 a corresponding "total" number of BMS bearers (at 214). For BMS bearers allocated to and managed by a particular agency, the TMGIs for the BMS bearers, for example, may be distributed to the various agencies to identify the portion of the total number of BMS bearers allocated and managed for use by the respective local call controllers (at 218, 222). Each local call controller 170, 180 stores its locally managed allocation of BMS bearers, e.g. in a resources management database, respectively (at 224, 220). For BMS bearers reserved for shared usage by the local call controllers, the TMGIs for the BMS bearers, for example, may be stored in the central resource manager 102 and allocated, as needed (at 216).

Once a local call controller is locally managing at least one allocated BMS bearer, it can itself (i.e. without the central resource manager 102) assign a BMS bearer from its locally managed allocations of BMS bearers to transport media to a communication group, wherein a communication group is defined as a group of member devices and/or users that become associated or affiliated with the group for the purposes of receiving one or more common media streams. The common media streams may be any type of media; and where the media distributed is voice, the communication group is referred to as a "talkgroup". Moreover, a media stream is defined as messaging comprising one or more packets that carry media (e.g. voice, data, video, etc.), and a packet is defined in general as a message structure for partitioning the media stream for transmission. However, the message structure of the media does not limit the scope of the teachings herein; as such the teachings can be applied to the transmission of media streams having other message structures.

When the local call controller 170 receives a request to transmit a media stream to a communication group, the local call controller 170 determines the members of the communication group identified in the call (e.g. PTT) request and selects a set of BMS service areas, wherein the set typically includes those BMS service areas in which group members are located. After determining the set of BMS services areas, the local call controller 170 attempts to identify one or more available BMS bearers (from its locally managed allocations of BMS bearers) in each of the selected BMS services areas to assign to transport the media stream for the communication group. In one illustrative implementation, the local call controller 170 consults a resource management database that, at a minimum, contains a listing of all of the BMS bearers in each BMS service area and a simple indication of current communication group assignment status for each of the BMS bearers, for example, assigned or available (i.e. unassigned). In an embodiment, the resource management database further maintains for each assigned BMS bearer, an identification of the communication group to which the BMS bearer is assigned.

Where the local call controller has sufficient BMS bearers in each BMS service area in its locally managed allocations, it can simply assign those BMS bearers to support the group communications. However, embodiments of the present disclosure address the scenario where the local call controller either does not have sufficient BMS bearers in one or more BMS service areas in its locally managed allocations to support the group communications, or the local call controller anticipates that it may run short of BMS bearers in its locally managed allocations and takes anticipatory measures to manage additional BMS bearer allocations.

As regards to the messaging exchanged with the UE shown in the message sequence diagrams of FIGS. 3-7, any suitable signaling can be used for the messages. In one illustrative example, signaling in accordance with the OMA PoC TS is used to exchange messaging with the UE, e.g. the call requests and call grants, but the particular messaging depends on the protocols (i.e. proprietary or standard) being used by the devices sending the messaging. More particularly, in the case wherein OMA PoC is implemented, the call request is a PTT request that is communicated by way of floor control signaling, for instance in a Talk Burst Control Protocol (TBCP) message, from a PTT Client affiliated with a particular communication group that is identified by a talkgroup identifier, for instance. However, in an alternative embodiment, the request could be communicated using a SIP INVITE message.

With regards to the call grant messages, after a BMS bearer is assigned to a call, the local call controller identifies the assigned BMS bearer to the members of the communication group, for example, using a "call grant" message comprising an identifier for the BMS bearer (e.g. TMGI). Alternatively, although in some instances not as efficient and limiting in the amount of data that can be put into the messages, the identifier for the BMS bearer could be included in floor control signaling to the PTT Client sending the PTT request (i.e. the PTT requestor) and to the other group members notifying the corresponding UE (and users) that a session is granted in response to the PTT request. For example, the floor control signaling comprises a call grant message to the PTT requestor and a call taken message to the other group members, as described in OMA-TS-PoC_UserPlane-V1_0-3-20090922-A. The messaging sent between the central resource manager 102 and the local call controllers 170, 180 can also take on any suitable format, standard or proprietary. For example, real time control protocol (RTCP) based messages of which OMA-PoC floor signaling is based, SIP messages, proprietary messaging on top of UDP/IP or SCTP, etc. can be used.

Figure 3:
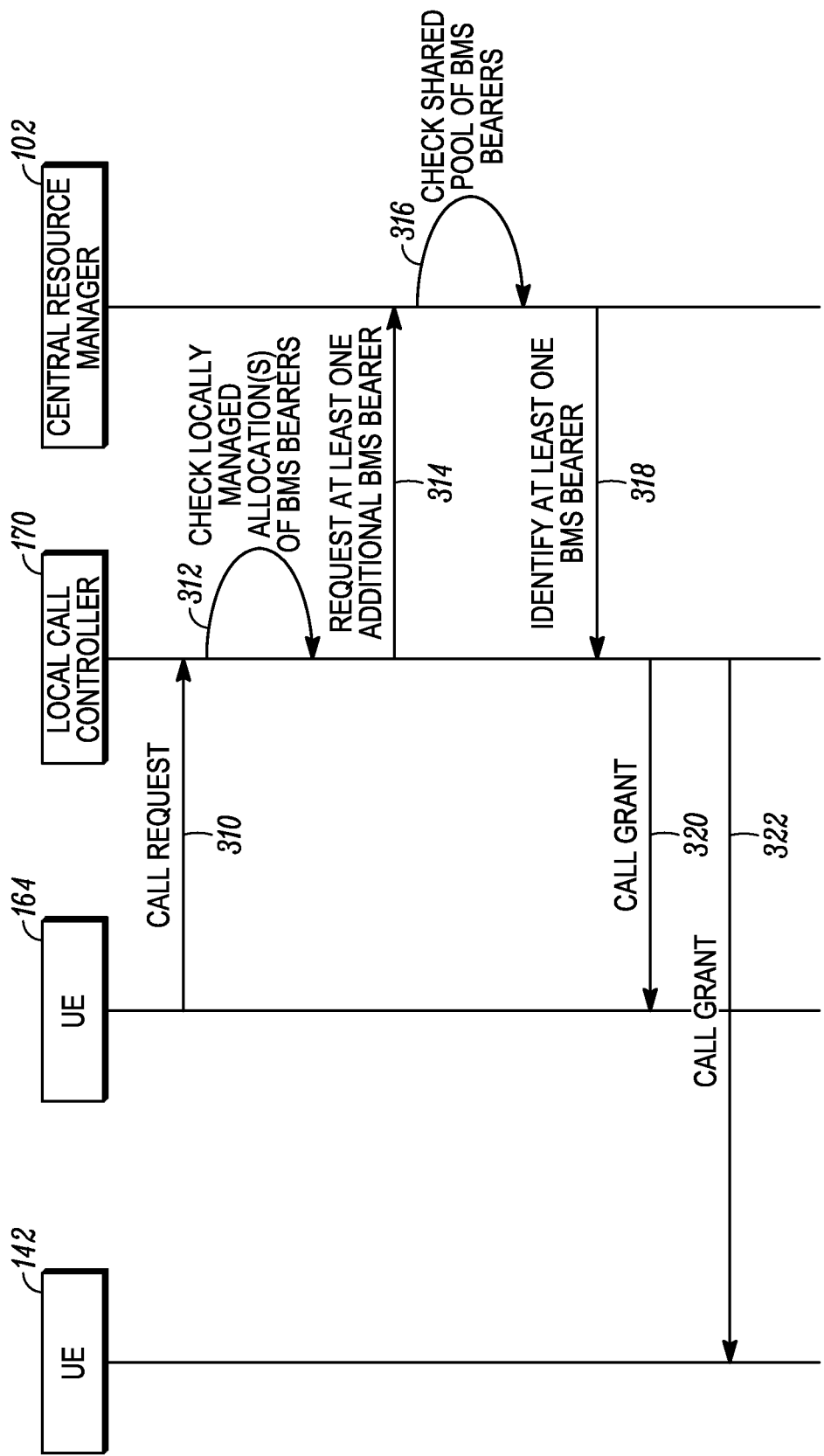
FIG. 3 is a message sequence diagram illustrating a method for managing at least one BMS bearer in accordance with another embodiment.

FIG. 3 illustrates UE 142 and 164, a local call controller 170, and a central resource manager 102. In an illustrative use case scenario, the local call controller 170 is owned and/or operated by an Agency A, and the coverage area for the local call controller 170 includes service areas 126, 128, and 130. As such, in this example, the local call controller 170 is locally managing allocations from the central resource manager of BMS bearers covering these service areas. Users from Agency A are located in BMS SA1 and BMS SA4 126, 132, and a call request for a group call is made by one of the users (e.g. UE 164; at 310). The local call controller for Agency A 170 checks its locally managed allocation(s) of BMS bearers (at 312) and determines that it locally managing a BMS bearer allocation that is located in BMS SA1 but not BMS SA4. The local call controller for Agency A 170, thus, requests an additional BMS bearer, e.g. a voice channel, from the central resource manager 102 covering BMS SA4 (at 314).

The central resource manager 102 checks it shared pool of BMS bearers (at 316) and determines that it has an available BMS bearer in the shared pool that is located in BMS SA4. In this example, the central resource manager 102 temporarily allocates (e.g. "loans") at least one BMS bearer to the local call controller for Agency A 170, and marks the particular BMS bearer that was temporarily allocated from the shared pool as unavailable. In this case, temporarily means that the BMS bearer will be released back to the shared pool after the call ends or some pre-established or negotiated time period thereafter. Temporarily further means that the BMS bearer is not stored as a local allocation to be managed by the local call controller for Agency A 170 for assignment to future group communications.

The central resource manager 102 identifies the BMS bearer from the shared pool to the local call controller for Agency A 170 (e.g. via a TMGI for the bearer) (at 318). Upon receipt, the local call controller for Agency A 170 assigns the BMS bearers to the call, and signals the start of the call, via a call grant, to the users using the identifiers for the BMS bearers: the BMS bearer located in BMS SA 4 132 for use by UE 164 that was assigned to the call by the local call controller 170 from a temporarily allocation from the shared pool of BMS bearers, and the BMS bearer covering service area 1 126 for use by UE 142 that was assigned to the call by local call controller 170 from its locally managed allocations of BMS bearers (at 320 and 322).

Figure 4:
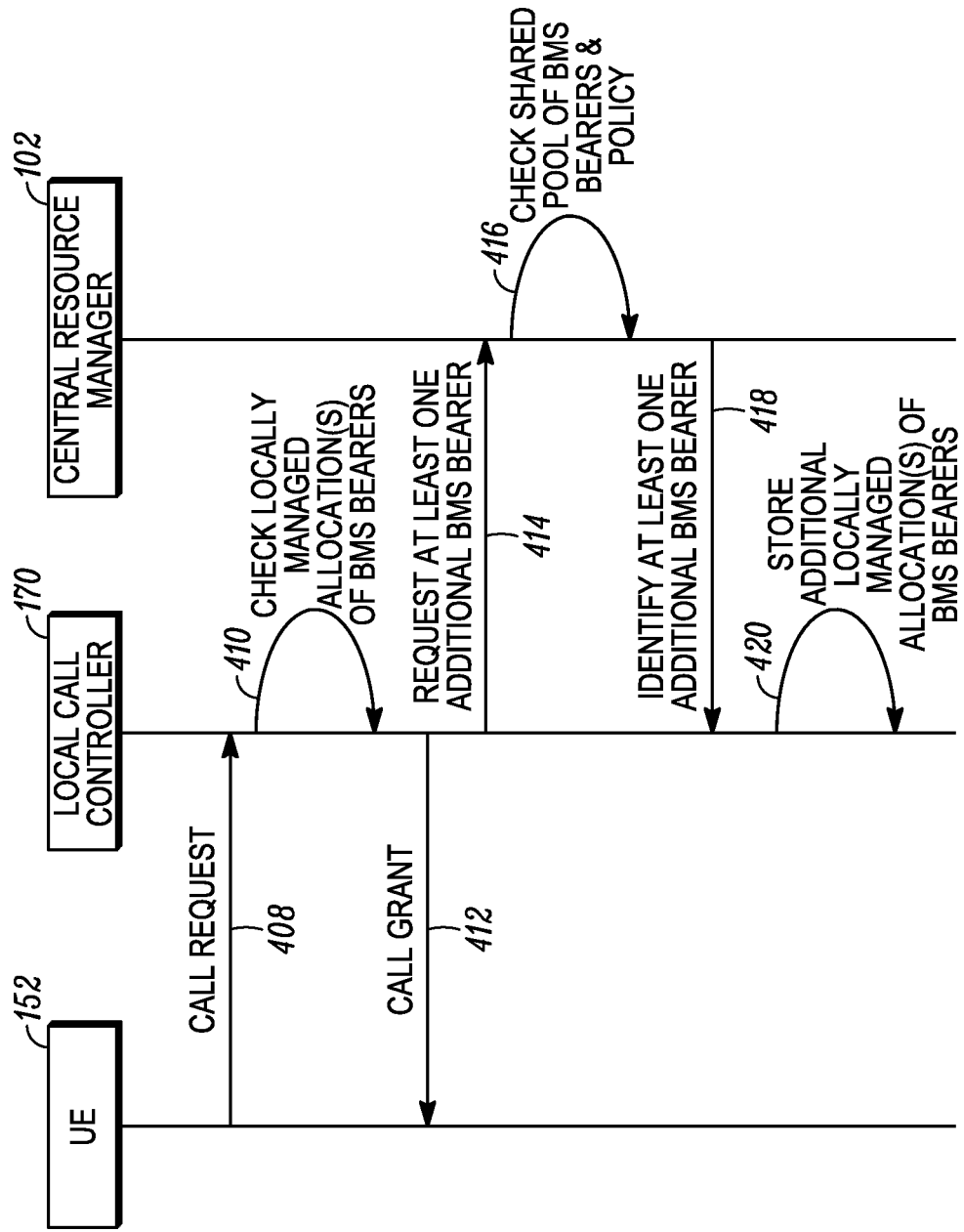
FIG. 4 is a message sequence diagram illustrating a method for managing at least one BMS bearer in accordance with another embodiment.

FIG. 4 illustrates the embodiment where a local call controller is allocated at least one additional BMS bearer from the shared pool to manage and include in its local allocation. FIG. 4 illustrates a UE 152, a local call controller 170, and a central resource manager 102. In an illustrative use case scenario, the local call controller 170 is owned and/or operated by an Agency A, and the coverage area for the local call controller includes BMS SA1 to BMS SA3 126-130, in this example. As such, in this example, the local call controller 170 is locally managing allocations from the central resource manager of BMS bearers covering these service areas.

A user (e.g. UE 152) from Agency A is located in BMS SA3 130. A call request for a group call is made by the user 152 (at 408). The local call controller for Agency A 170 checks its locally managed allocation(s) of BMS bearers (at 410), and determines that it is locally managing allocations of BMS bearers that are able to sufficiently support the call. The local call controller for Agency A 170 assigns a BMS bearer located in BMS SA3 130 from its locally managed allocations to the call, marks the BMS bearer as unavailable, and signals the start of the call, via a call grant, to the user 152 (at 412).

Upon allocating the local BMS bearer for the group call (at 412), the local call controller for Agency A 170 determines that it has depleted its locally managed allocations of BMS bearers located in BMS SA3 130 and requests at least one additional BMS bearer allocation located in BMS SA3 to avoid busying future calls. In this example, the local call controller for Agency A 170, therefore, requests the at least one additional BMS bearer allocation from the central resource manager 102 (at 414). The central resource manager 102 checks its shared pool of BMS bearers and policy database to determine whether it is allowed to fulfill such a request from this particular local call controller for Agency A 170 (at 416), and determines that Agency A is below its maximum allocation of BMS bearers located in BMS SA3 130. Upon determining that there are shared BMS bearers located in BMS SA3 that it can allocate to Agency A to manage, the central resource manager 102 identifies the at least one additional BMS bearer to the local call controller for Agency A 170 (e.g. via a TMGI for the bearer(s); at 418), and removes the identified BMS bearer(s) from the shared pool. The local call controller for Agency A 170 stores the at least one additional BMS bearer to its locally managed allocations of BMS bearers (at 420) for assignment to future calls.

Figure 5:
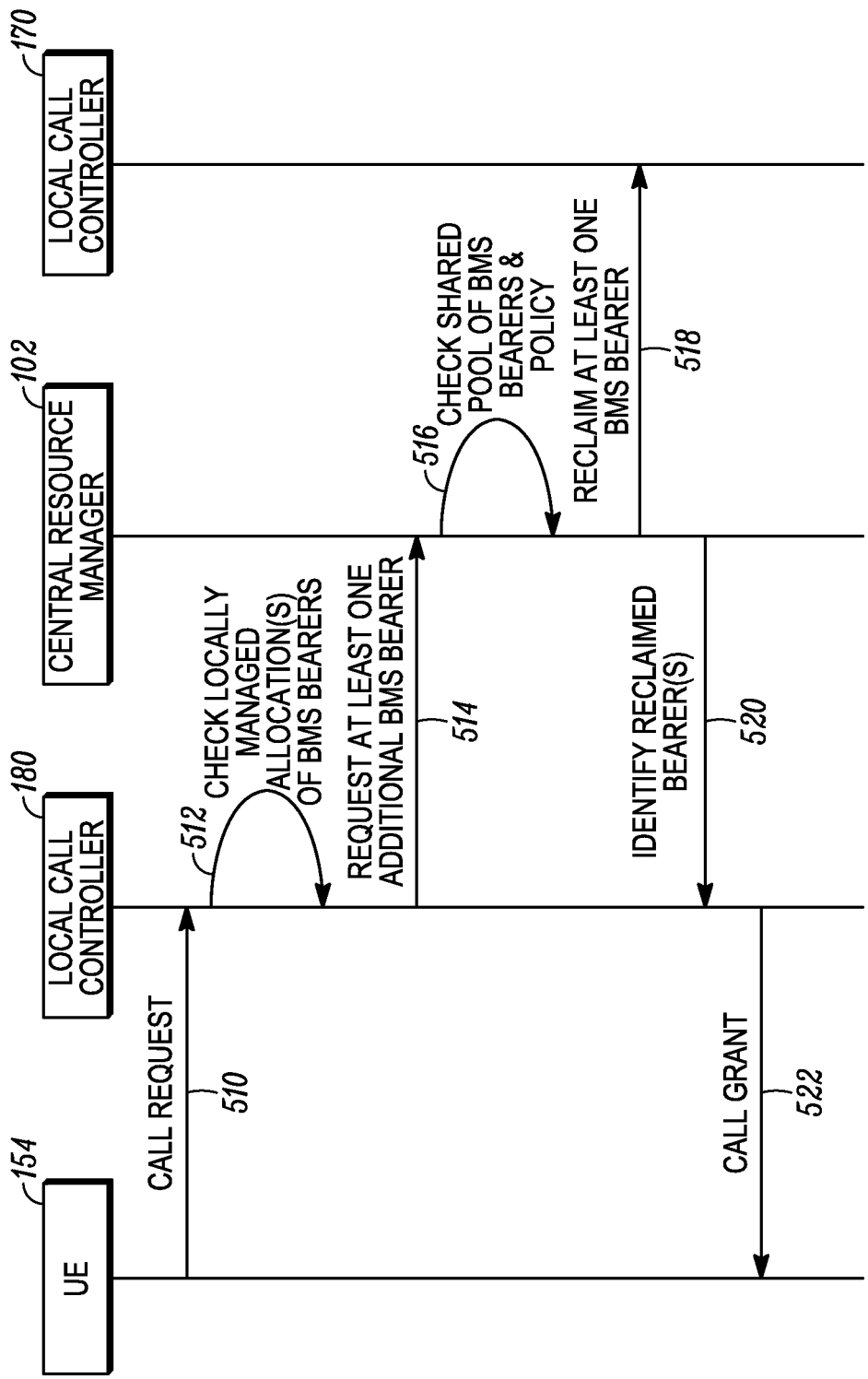
FIG. 5 is a message sequence diagram illustrating a method for managing at least one BMS bearer in accordance with another embodiment.

FIG. 5 illustrates an embodiment where the central resource manager reclaims an allocated BMS bearer being locally managed by a local call controller and returns it to the shared pool of BMS bearers in order to allocate the reclaimed BMS bearer to another local call controller, as needed. FIG. 5 illustrates a UE 154, local call controllers 180 and 170, and a central resource manager 102.

In an illustrative use case scenario, a user (e.g. UE 154) from an Agency B is located in BMS SA3 130. A call request for a group call is made by this user 154 (at 510). The local call controller for Agency B 180 checks it locally managed allocations of BMS bearers (at 512), and determines that it is not managing any available BMS bearers located in BMS SA3 130. The local call controller for Agency B 180 requests at least one additional BMS bearer allocation from the central resource manager 102 (at 514). The central resource manager 102 checks its shared pool of BMS bearers and policy database (at 516) to determine whether additional BMS bearers should be allocated to Agency B. In this example, let us assume that this request is for a high priority call. The central resource manager 102 determines that additional BMS bearers can be allocated to Agency B, but it does not have an available shared BMS bearer located in BMS SA3. However, the central resource manager 102 determines that the local call controller for Agency A 170 is locally managing an available BMS bearer located in BMS SA3 130, and reclaims the particular BMS bearer from the local call controller for Agency A 170 for shared use (at 518). The central resource manager 102 allocates and identifies (e.g. via the TMGI for the bearer) the reclaimed BMS bearer to the local call controller for Agency B 180 (at 520). The local call controller for Agency B 180 assigns the reclaimed BMS bearer to the call, and signals the start of the call, via a call grant, to the user (at 522). Depending on system policy, after the end of the call or some predetermined time, the reclaimed BMS bearer may be stored and locally managed by the local call controller for Agency A 170, stored and locally managed by the local call controller for Agency B 180, or stored and locally managed by the central resource manager 102 as a shared resource.

Figure 6:
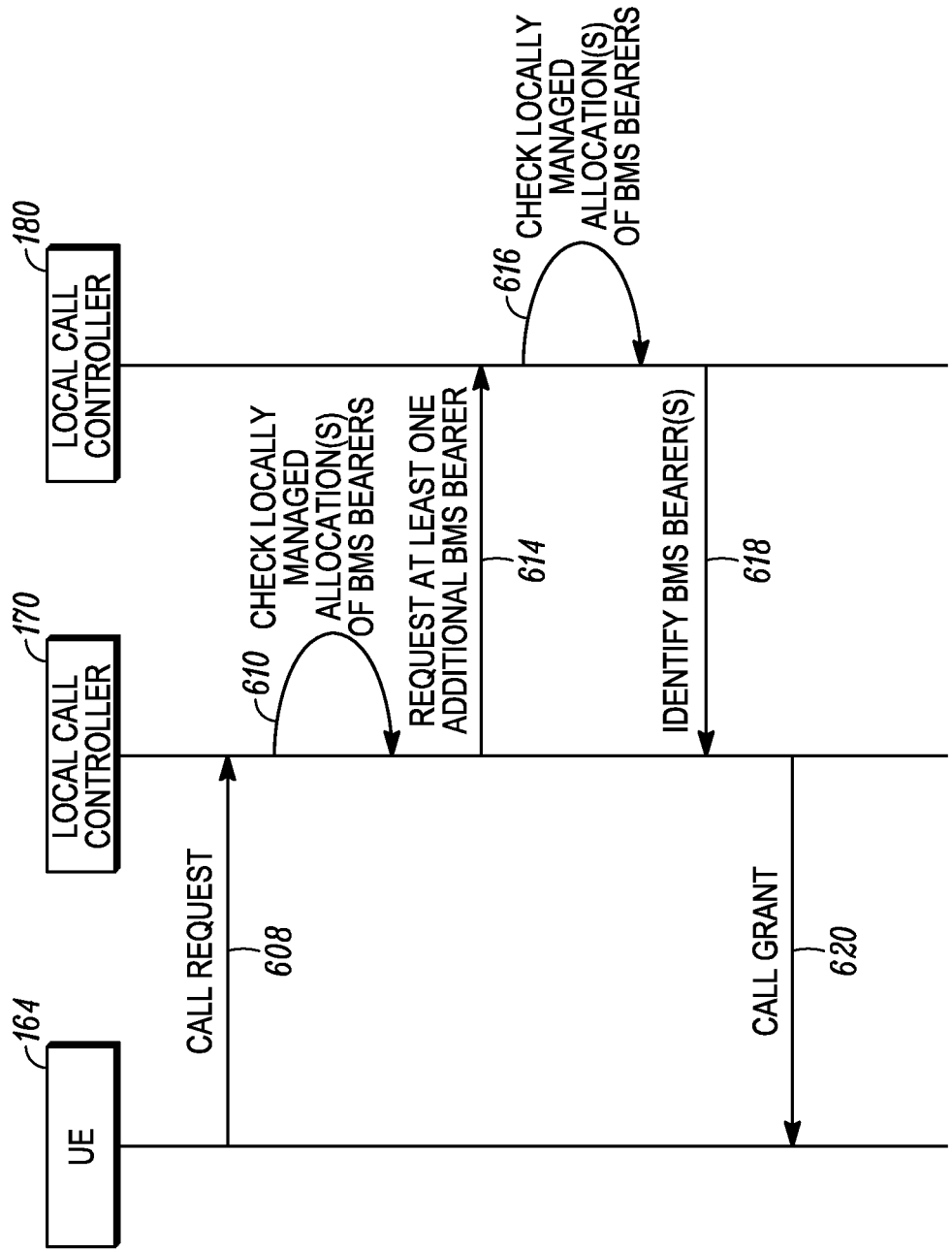
FIG. 6 is a message sequence diagram illustrating a method for managing at least one BMS bearer in accordance with another embodiment.

FIG. 6 illustrates an embodiment where local call controllers 170, 180 share BMS bearers between one another from their locally managed allocations of BMS bearers, respectively. FIG. 6 illustrates a UE 164, a local call controller 170, and a local call controller 180. In an illustrative use case scenario, the local call controller 170 is owned and/or operated by an Agency A, and the coverage area for the local call controller 170 comprises BMS SA1 to BMS SA3 126-130 in this example. As such, in this example, the local call controller 170 is locally managing allocations from the central resource manager of BMS bearers located in these service areas.

A user (e.g. UE 164) from Agency A is located in BMS SA4 132, for instance, and assisting an incident managed by an Agency B. A call request for a group call is made by this user 164 (at 608). The local call controller for Agency A 170 checks its locally managed allocations of BMS bearers (at 610), and determines that it is not locally managing any allocations of BMS bearers located in BMS SA4 164. The local call controller for Agency A 170 requests at least one additional BMS bearer from the local call controller for Agency B 180 since it is providing assistance to Agency B (at 614). The local call controller for Agency B 180 checks its locally managed allocations of BMS bearers (at 616), and determines that it is locally managing an available BMS bearer located in BMS SA4 132. The local call controller for Agency B 180 identifies (e.g. via a TMGI for the bearer; at 618) and allocates a BMS bearer located in BMS SA4 132 to the local controller of Agency A 170, and marks the particular BMS bearer as unavailable. The local call controller for Agency A 170 assigns the BMS bearer to the call, and signals the start of the call, via a call grant, to the user 164 (at 620). At the end of the call, or some predetermined time, the BMS bearer may be returned to the local call controller for Agency B 180 and marked as available for future group communications.

FIG. 7 illustrates an embodiment facilitating multi-agency shared BMS bearers. FIG. 7 illustrates UE 146, 156, 158, and 164, local call controllers 170 and 180, and a central resource manager 102. In an illustrative implementation scenario, the local call controller 170 is owned and/or operated by an Agency A, and the local call controller 180 is owned and/or operated by an Agency B. Users (e.g. UE 146 and 156) from Agency A are located in BMS SA1 and BMS SA3 in this example. Users (e.g. UE 158 and UE 164) from Agency B are located in BMS SA3 and BMS SA4 in this example. A call request for a group call is made by one of the users (e.g. UE 156; at 716). The local call controller for Agency A 170 determines that this call should be common/shared with Agency B, and coordinates the call setup with the local call controller for Agency B (at 718). Since this is a multi-agency call, the local call controller for Agency A 170 determines that BMS bearers are needed in BMS SA1, BMS SA3 and BMS SA4 126, 130, 132. However, the local controller for Agency A 170 checks its locally managed allocation(s) of BMS bearers (at 720) and determines that it is only locally managing allocations of BMS bearers located in BMS SA1 to BMS SA3 126-130, but not BMS SA4 132.

The local call controller for Agency A 170 requests at least one additional BMS bearer from the central resource manager 102 (at 722). The central resource manager 102 checks the shared pool of BMS bearers (at 724), and determines that it has available at least one shared BMS bearer for the requested BMS SAs. The central resource manager 102 identifies the shared BMS bearer(s) to the local call controller for Agency A 170 (e.g. via TMGIs for the bearer(s); at 726), allocates the necessary BMS bearer(s) from the shared pool, and marks the shared BMS bearer as unavailable. The central resource manager 102 also identifies the BMS bearer(s) to the local call controller for Agency B 180 since it is also part of the call (at 728). The local call controller for Agency A 170 assigns the BMS bearers to the call, and signals the start of the call, via a call grant, to its users 156, 146, indicating the shared BMS bearer to be used (e.g. providing the TMGI value for the bearer; at 730, 734). The local call controller for Agency B 180 signals the start of the call, via a call grant, to its users 158, 164, indicating the shared BMS bearer to be used (at 732, 736).

It should be noted that in the example described above in FIG. 7, since this call is common to multiple agencies, BMS bearers from the shared pool can be used to cover the entire call. As such, the local call controller for Agency A 170 may request BMS bearers located in all of the BMS SAs needed for the call, BMS SA1, BMS SA3 and BMS SA4 126, 130, 132 from the central resource manager 102 (even though it locally managing allocations of available BMS bearers covering BMS SA1 and BMS SA3).

In an alternative embodiment, the local call controller for Agency A 170 may assign available BMS bearers located in BMS SA1 and BMS SA3 126, 130 from its locally managed allocations, and only request a BMS bearer located in BMS SA4 132 from the shared pool. In this alternative embodiment, a mechanism is then used to convey the BMS bearers the local call controller for Agency A 170 assigned from its locally managed allocations to the local call controller for Agency B 180. For example, this could be done through the shown messaging; for instance the request for at least one additional BMS bearer (at 722) could identify the two BMS bearers assigned by the local call controller for Agency A 170 from its locally managed allocations that are located in BMS SA1 and BMS SA3 126, 130 as well as the request for the additional BMS bearer located in BMS SA4 132 from the shared pool. As such, the central resource manager 102 would be able to identify all the BMS bearers used for the call, even the BMS bearers assigned from local call controller for Agency A 170 from its locally managed allocations. Another alternative is that the local call controller for Agency A 170 could forward the identity of the BMS bearers assigned to the call from its locally managed allocations to the local call controller for Agency B, and the central resource manager could identify the BMS bearer assigned to the call from the shared pool.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

An embodiment for managing at least one broadcast/multicast service (BMS) bearer among a plurality of communication groups is disclosed in the present invention. A central resource manager is communicatively coupled to a BMS capable system. The BMS capable system has a radio access network partitioned into at least one BMS service area and a total number of BMS bearers for transporting media streams, wherein each BMS service area has associated therewith a portion of the total number of BMS bearers. The central resource manager is configured to perform the steps of: allocating, to a first local call controller of a plurality of local call controllers, a first portion of the total number of BMS bearers to be managed locally by the first local call controller; identifying the first portion of the total number of BMS bearers to the first local call controller; and managing a second portion of the total number of BMS bearers for a subsequent allocation to at least one local call controller of the plurality of local call controllers.

According to a further embodiment, the total number of BMS bearers is established a priori.

According to another further embodiment, each established BMS bearer is identified using a different temporary mobile group identifier.

According to another further embodiment, the central resource manager is further configured to perform the steps of: receiving, from the first local call controller, a request for an additional BMS bearer; and identifying, to the first local call controller, the additional BMS bearer from the second portion of the total number of BMS bearers.

According to yet a further embodiment, the additional BMS bearer from the second portion of the total number of BMS bearers is temporarily allocated to the first local call controller.

According to another further embodiment, the central resource manager is further configured to perform the step of returning the additional BMS bearer back to the second portion of the total number of BMS bearers once a communication being transported over the additional BMS bearer has ended.

According to another further embodiment, the central resource manager is further configured to perform the step of returning the additional BMS bearer back to the second portion of the total number of BMS bearers after a predetermined time.

According to another further embodiment, the additional BMS bearer from the second portion of the total number of BMS bearers is allocated for inclusion in the first portion of the total number of BMS bearers, and further comprising removing the additional BMS bearer from the second portion of the total number of BMS bearers.

According to another further embodiment, the central resource manager is further configured to perform the step of identifying, to a second local call controller, a third portion of the total number of BMS bearers, wherein the third portion of BMS bearers is managed locally by the second local call controller.

According to another further embodiment, the central resource manager is further configured to perform the steps of: receiving, from the first local call controller, a request for an additional BMS bearer; reclaiming a BMS bearer identified in the third portion of the total number of BMS bearers from the second local call controller; and identifying, to the first local call controller, in response to the request for resources, the BMS bearer reclaimed from the third portion of the total number of BMS bearers.

An embodiment for managing at least one broadcast/multicast service (BMS) bearer among a plurality of communication groups is also disclosed. A first local call controller is communicatively coupled to a BMS capable system. The BMS capable system has a radio access network that includes at least one BMS service area and a total number of BMS bearers for transporting media streams, wherein each BMS service area has associated therewith a portion of the total number of BMS bearers. The first local call controller configured to perform the steps of: receiving, from a central resource manager, an identification of a first portion of the total number of BMS bearers allocated to the first local call controller; locally managing the allocation of the first portion of the total number of BMS bearers; receiving a request to transmit a media stream to a communication group; if there are sufficient BMS bearers in the first portion of the total number of BMS bearers to support transmission of the media stream to the communication group, assigning at least one BMS bearer from the first portion of the total number of BMS bearers to the group communication; and if there are insufficient BMS bearers in the first portion of the total number of BMS bearers to support transmission of the media stream to the communication group, sending a request for at least one additional BMS bearer, and responsive to the request for the at least one additional BMS bearer, receiving an identification of at least one additional BMS bearer from the total number of BMS bearers.

According to another further embodiment, wherein the first local call controller sends the request for the at least one additional BMS bearer to a second local call controller in the BMS capable system, and receives from the second local call controller the identification of the at least one additional BMS bearer from a second portion of the total number of BMS bearers, wherein the second portion of the total number of BMS bearers is allocated to and locally managed by the second local call controller.

According to another further embodiment, the first local call controller sends the request for the at least one additional BMS bearer to the central resource manager, and receives from the central resource manager the identification of the at least one additional BMS bearer from a second portion of the total number of BMS bearers, wherein the second portion of the total number of BMS bearers is allocated and locally managed by a second local call controller in the BMS capable system.

According to another further embodiment, the first local call controller sends the request for the at least one additional BMS bearer to the central resource manager, and receives from the central resource manager the identification of the at least one additional BMS bearer from a second portion of the total number of BMS bearers, wherein the second portion of the total number of BMS bearers is part of a shared pool of BMS bearers that is managed by the central resource manager.

According to another further embodiment, the at least one additional BMS bearer from the second portion of the total number of BMS bearers is temporarily allocated to the first local call controller.

According to another further embodiment, the first local call controller is further configured to perform the step of adding the at least one additional BMS bearer to the first portion of the total BMS bearers upon receipt of its identification.

According to another further embodiment, each BMS bearer is identified using a different temporary mobile group identifier.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for allocating Multimedia BMS bearers in a 3GPP capable system as described herein. The non-processor circuits may include, but are not limited to, a radio receiver, a radio transmitter, signal drivers, clock circuits, power source circuits, and user input devices. As such, these functions may be interpreted as steps of a method to perform the allocating of Multimedia BMS bearers in a 3GPP capable system as described herein. Alternatively, some or all functions could be implemented by a state machine that has no stored program instructions, or in one or more ASICs, in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g. comprising a processing device) to perform a method as described and claimed herein. Examples of such computer-readable storage elements include, but are not limited to, a hard disk, a CD-ROM, an optical storage device, a magnetic storage device, a read only memory (ROM), a programmable read only memory (PROM), an erasable programmable read only memory (EPROM), an electrically erasable programmable read only memory (EEPROM) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The abstract of the disclosure is provided to allow the reader to quickly ascertain the nature of the technical disclosure. It is submitted with the understanding that it will not be used to interpret or limit the scope or meaning of the claims. In addition, in the foregoing detailed description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing at least one broadcast/multicast service (BMS) bearer among a plurality of communication groups, wherein a central resource manager is communicatively coupled to a BMS capable system, the BMS capable system having a radio access network partitioned into at least one BMS service area and a total number of BMS bearers for transporting media streams, and wherein each BMS service area has associated therewith a portion of the total number of BMS bearers, the central resource manager configured to perform the steps of:
    allocating, to a first local call controller of a plurality of local call controllers, a first portion of the total number of BMS bearers to be managed locally by the first local call controller;
    identifying the first portion of the total number of BMS bearers to the first local call controller;
    managing a second portion of the total number of BMS bearers for a subsequent allocation to at least one second local call controller of the plurality of local call controllers; and
    wherein the BMS bearers are established prior to allocation to the first local call controller and the at least one second local call controller of the plurality of local call controllers.

2. The method of claim 1, wherein each established BMS bearer is identified using a different temporary mobile group identifier.

3. The method of claim 1 further comprising:
    receiving, from the first local call controller, a request for an additional BMS bearer; and
    identifying, to the first local call controller, the additional BMS bearer from the second portion of the total number of BMS bearers.

4. The method of claim 3, wherein the additional BMS bearer from the second portion of the total number of BMS bearers is temporarily allocated to the first local call controller.

5. The method of claim 4 further comprising returning the additional BMS bearer back to the second portion of the total number of BMS bearers once a communication being transported over the additional BMS bearer has ended.

6. The method of claim 4 further comprising returning the additional BMS bearer back to the second portion of the total number of BMS bearers after a predetermined time.

7. The method of claim 3, wherein the additional BMS bearer from the second portion of the total number of BMS bearers is allocated for inclusion in the first portion of the total number of BMS bearers, and further comprising removing the additional BMS bearer from the second portion of the total number of BMS bearers.

8. The method of claim 1 further comprising identifying, to a second local call controller, a third portion of the total number of BMS bearers, wherein the third portion of BMS bearers is managed locally by the second local call controller.

9. The method of claim 8 further comprising:
    receiving, from the first local call controller, a request for an additional BMS bearer;
    reclaiming a BMS bearer identified in the third portion of the total number of BMS bearers from the second local call controller; and
    identifying, to the first local call controller, in response to the request for resources, the BMS bearer reclaimed from the third portion of the total number of BMS bearers.

10. The method of claim 1, wherein the at least one local call controller of the plurality of local call controllers comprises a second local call controller, wherein the first portion of the total number of established BMS bearers are reserved for use by the first local call controller, wherein the second portion of the total number of established BMS bearers are reserved for use by the second local call controller, and wherein a third portion of the total number of established BMS bearers are in a common pool for sharing among the plurality of local call controllers as needed.

11. A method for managing at least one broadcast/multicast service (BMS) bearer among a plurality of communication groups, wherein a first local call controller is communicatively coupled to a BMS capable system, the BMS capable system having a radio access network that includes at least one BMS service area and a total number of BMS bearers for transporting media streams, and wherein each BMS service area has associated therewith a portion of the total number of BMS bearers, the first local call controller configured to perform the steps of:
    receiving, from a central resource manager, an identification of a first portion of the total number of BMS bearers allocated to the first local call controller;

locally managing the allocation of the first portion of the total number of BMS bearers;

receiving a request to transmit a media stream to a communication group;

if there are sufficient BMS bearers in the first portion of the total number of BMS bearers to support transmission of the media stream to the communication group, assigning at least one BMS bearer from the first portion of the total number of BMS bearers to the group communication; and if there are insufficient BMS bearers in the first portion of the total number of BMS bearers to support transmission of the media stream to the communication group, sending a request for at least one additional BMS bearer, and responsive to the request for the at least one additional BMS bearer, receiving an identification of at least one additional BMS bearer from the total number of BMS bearers.

12. The method of claim 11, wherein the first local call controller sends the request for the at least one additional BMS bearer to a second local call controller in the BMS capable system, and receives from the second local call controller the identification of the at least one additional BMS bearer from a second portion of the total number of BMS bearers, wherein the second portion of the total number of BMS bearers is allocated to and locally managed by the second local call controller.

13. The method of claim 11, wherein the first local call controller sends the request for the at least one additional BMS bearer to the central resource manager, and receives from the central resource manager the identification of the at least one additional BMS bearer from a second portion of the total number of BMS bearers, wherein the second portion of the total number of BMS bearers is allocated and locally managed by a second local call controller in the BMS capable system.

14. The method of claim 11, wherein the first local call controller sends the request for the at least one additional BMS bearer to the central resource manager, and receives from the central resource manager the identification of the at least one additional BMS bearer from a second portion of the total number of BMS bearers, wherein the second portion of the total number of BMS bearers is part of a shared pool of BMS bearers that is managed by the central resource manager.

15. The method of claim 14, wherein the at least one additional BMS bearer from the second portion of the total number of BMS bearers is temporarily allocated to the first local call controller.

16. The method of claim 14, further comprising adding the at least one additional BMS bearer to the first portion of the total BMS bearers upon receipt of its identification.

17. The method of claim 11, wherein each BMS bearer is identified using a different temporary mobile group identifier.

18. A central resource manager capable of serving a broadcast/multicast service (BMS) capable system, the BMS capable system having a radio access network partitioned into at least one BMS service area and a total number of BMS bearers for transporting media streams, the central resource manager comprising:

a processor configured to:
allocate, to a first local call controller of a plurality of local call controllers, a first portion of a pool of established BMS bearers to be managed locally by the first local call controller;
identify the first portion of the pool of established BMS bearers to the first local call controller; and
allocate a second portion of the pool of established BMS bearers to a second local call controller of the plurality of local call controllers, wherein allocating the second portion of the pool of established BMS bearers comprises identifying the second portion of the pool of established BMS bearers to the second local call controller.

19. The central resource manager of claim 18, wherein the processor is configured to:
reserve the first portion of the pool of established BMS bearers for use by the first local call controller;
reserve the second portion of the pool of established BMS bearers for use by the second local call controller; and
reserve a third portion of the total number of established BMS bearers in a common pool for sharing among the plurality of local call controllers as needed.

\* \* \* \* \*

UNITED STATES PATENT AND TRADEMARK OFFICE
CERTIFICATE OF CORRECTION

PATENT NO. : 8,934,423 B2
APPLICATION NO. : 13/231530
DATED : January 13, 2015
INVENTOR(S) : Donald G. Newberg et al.

It is certified that error appears in the above-identified patent and that said Letters Patent is hereby corrected as shown below:

IN THE TITLE PAGE:

On Page 2, in Item (56), under "OTHER PUBLICATIONS," in Column 2, Line 41, delete "Netowrks,"" and insert -- Networks," --, therefor.

On Page 2, in Item (56), under "OTHER PUBLICATIONS," in Column 2, Line 64, delete "Reasearch" and insert -- Research --, therefor.

IN THE SPECIFICATION:

In Column 4, Line 61, delete "requested" and insert -- requested. --, therefor.

In Column 6, Line 24, delete "BMS GW114" and insert -- MBMS GW110 --, therefor.

In Column 6, Line 67, delete "PDN GW118" and insert -- PDN GW116 --, therefor.

In Column 12, Line 53, delete "BMS SA4164." and insert -- BMS SA4132. --, therefor.

Signed and Sealed this
Twelfth Day of July, 2016

Michelle K. Lee
*Director of the United States Patent and Trademark Office*